PAPER FEED MECHANISM FOR GRAPHIC COMMUNICATION RECORDING DEVICES

Filed Aug. 21, 1961 5 Sheets-Sheet 1

INVENTOR.
WALTER J. ZENNER
BY
Wallace, Kinzer & Dorn
Att'ys.

Dec. 17, 1963 W. J. ZENNER 3,114,490

PAPER FEED MECHANISM FOR GRAPHIC COMMUNICATION RECORDING DEVICES

Filed Aug. 21, 1961 5 Sheets-Sheet 2

INVENTOR.
WALTER J. ZENNER
BY
Wallace, Kinzer & Dorn
Att'ys.

Dec. 17, 1963 W. J. ZENNER 3,114,490

PAPER FEED MECHANISM FOR GRAPHIC COMMUNICATION RECORDING DEVICES

Filed Aug. 21, 1961 5 Sheets-Sheet 3

INVENTOR.
WALTER J. ZENNER
BY
Wallace, Kinzer & Dorn
Att'ys.

INVENTOR.
WALTER J. ZENNER
BY
Wallace, Kinzer & Dorn
Att'ys.

Dec. 17, 1963

W. J. ZENNER 3,114,490

PAPER FEED MECHANISM FOR GRAPHIC COMMUNICATION RECORDING DEVICES

Filed Aug. 21, 1961

5 Sheets-Sheet 5

INVENTOR.
WALTER J. ZENNER
BY
Wallace, Kinzer & Dorn
Att'ys.

3,114,490

PAPER FEED MECHANISM FOR GRAPHIC COMMUNICATION RECORDING DEVICES

Walter J. Zenner, Des Plaines, Ill., assignor to Peter G. S. Mero, Evanston, Ill.

Filed Aug. 21, 1961, Ser. No. 132,691
7 Claims. (Cl. 226—74)

This invention relates to record communication systems and more particularly to devices for controlling the feeding of a web of paper or other recording medium in a recording device for a graphic communication system of the kind in which data transcribed manually at one station are reproduced automatically at another station.

In a graphic communication system, a message or other data, such as a sketch, is written or drawn by hand upon a sheet of paper or the like at the transmitter, using a stylus which may resemble a pen or pencil insofar as size and shape are concerned. The stylus is connected to a translating apparatus which develops electrical control signals representative of the movements of the stylus. For example, the translating apparatus may be of the kind described in Patent No. 2,583,535 of Robert Adler, issued August 18, 1953. At the receiver of the system, the signals are used to control movements of another stylus, relative to a recording medium, to reproduce the same data as is transcribed manually at the transmitter.

In a system of this kind, it is necessary to replace the recording medium quite frequently, at both the transmitter and the receiver, in order to afford space for additional messages. The change of recording medium should be accomplished relatively rapidly, in order to avoid unduly restricting the amount of data which may be transmitted. On the other hand, the paper or other recording medium should be held almost completely flat on a writing surface in order to avoid interfering with the operation of either the transmitter or receiver stylus. Buckling, wrinkling, or twisting of the paper is highly undesirable, particularly because the stylus coupling linkages in systems of this kind are frequently made light in weight to minimize inertia effects and to permit convenient and accurate reproduction at both the transmitter and receiver.

Moreover, in a graphic communication system of this general kind, the precise form of the paper web or recording medium may vary to some extent. For example, in some applications the recording medium may simply comprise a roll of paper or as in other applications a pre-folded multiple copy form may be utilized. Rapid and accurate feeding of either kind of form, interchangeably, is sometimes necessary.

It is an object of the present invention, therefore, to provide for rapid yet accurate and closely controlled feeding of a paper web, pre-folded elongated paper form, or other recording medium in a recording device comprising a part of a graphic communication system.

A particular object of the invention is to afford a new and improved sprocket-type positive paper feed for a recording device in a graphic communication system that is capable of accurate yet rapid operation.

A related object of the invention is to provide a new and improved friction feed for feeding paper rapidly and accurately in a recording device comprising a part of a graphic communication system.

It is a related object of the invention to provide a new and improved paper feed mechanism which may be adapted, with only minor changes, to either a positive feed or a friction feed.

An additional object of the invention is to provide a new and simplified control device for actuating the paper feed mechanism in a recording device for a graphic communication system.

It is a general object of the invention to provide a new and improved base structure and paper feed mechanism which conjointly provide optimum protection against misalignment of the paper feed when the mechanism is assembled in a complete recording device.

A corollary object of the invention is to provide a new and improved paper feed apparatus for a graphic communication recorder that is simple and economical in construction yet affords improved operating characteristics in comparison with previously known paper feeds.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

Figure 1:
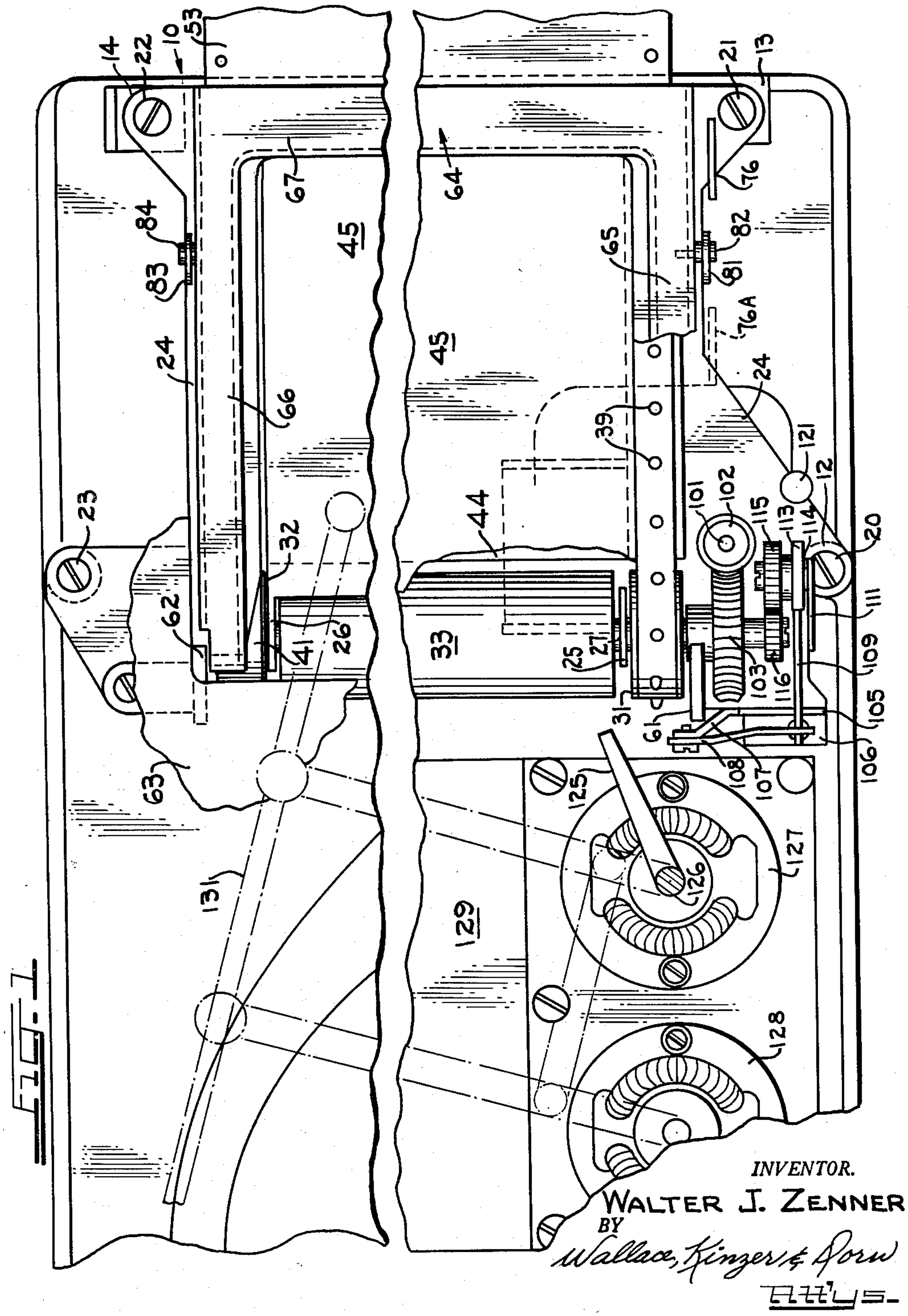
FIG. 1 is a plan view of a graphic communication recording device constructed in accordance with one embodiment of the invention, the cover of the device having been cut away to illustrate many of the working parts.
Figure 2:
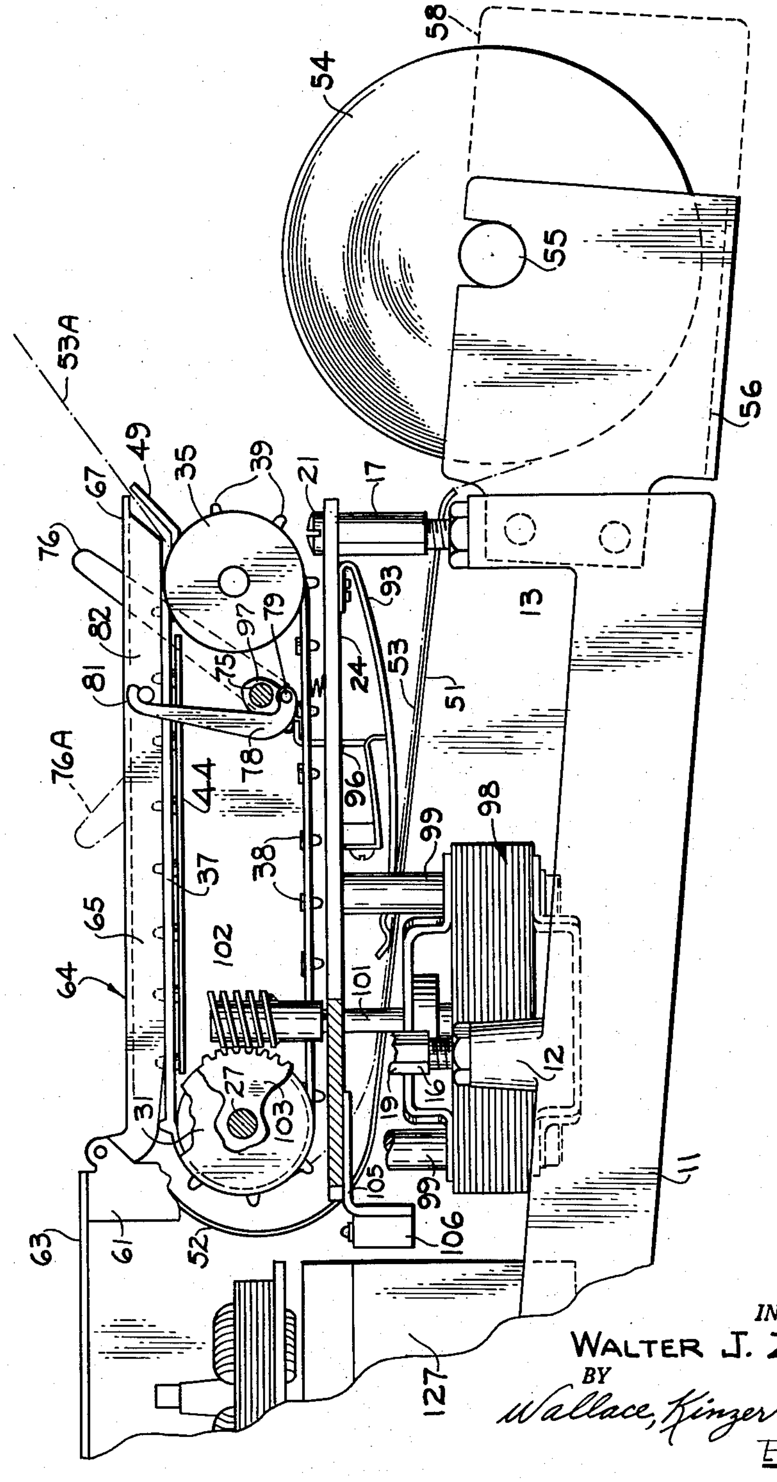
FIG. 2 is a side elevation view, partly in cross section, of the recording device of FIG. 1.
Figures 3, 4:
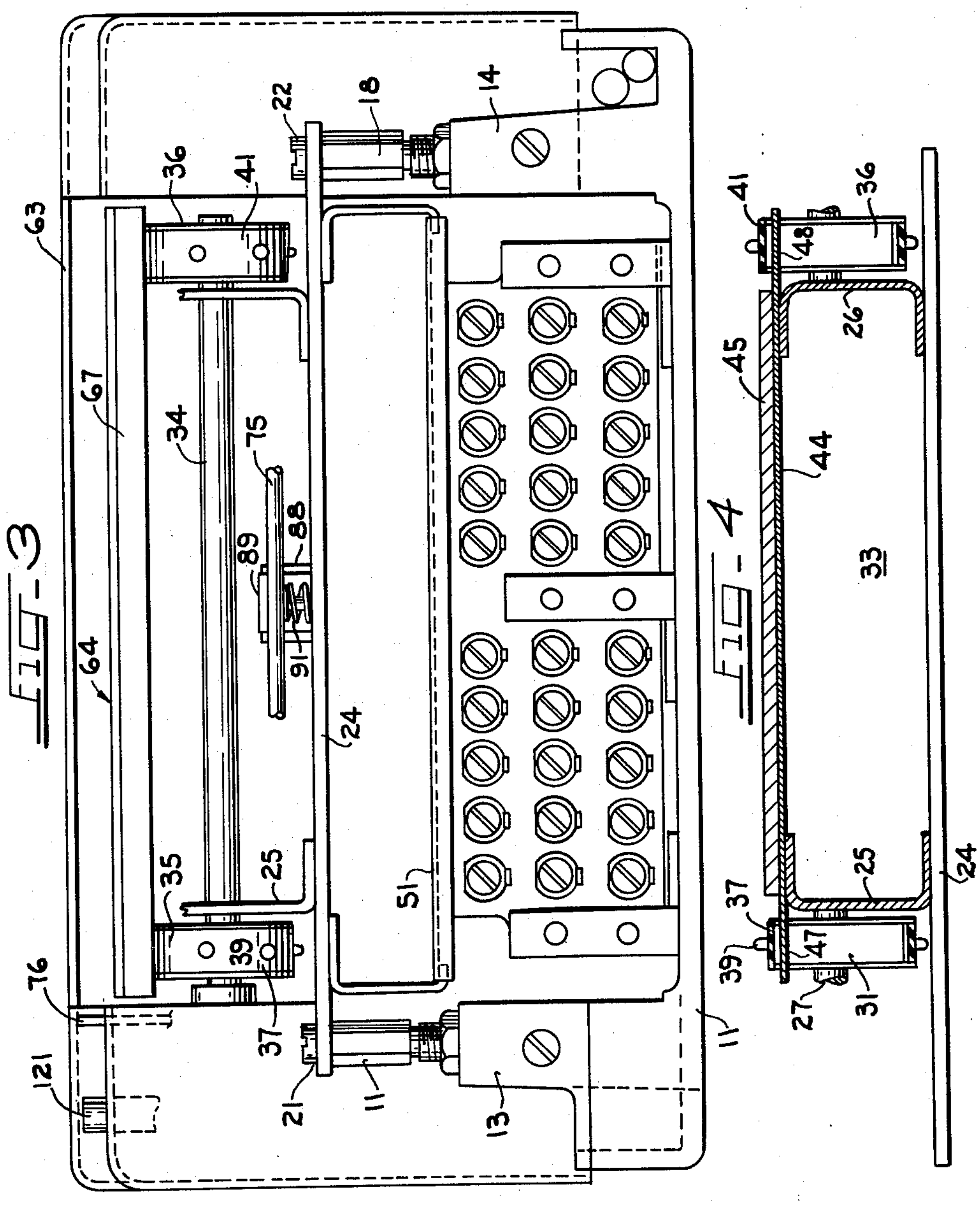
FIG. 3 is a front elevation view of the recording device of FIG. 1 with the front cover removed.
FIG. 4 is a detail sectional view taken approximately along line 4—4 in FIG. 1.

The graphic recorder 10 illustrated in FIGS. 1–3 comprises a base member 11, preferably a casting. The base member 11 is provided with a plurality of upwardly projecting bosses or support posts 12, 13, 14 and 15 (see FIG. 1). Each of the bosses 12–15 is provided with a central vertical tapped opening and a corresponding series of threaded support extensions 16, 17, 18 and 19 are mounted in the bosses 12, 13, 14 and 15, respectively. The support extension 17 is typical of these members and is provided with an upper hexagonal portion that extends above the threaded portion of the support extension. The upper end of the hexagonal portion of the support member 17 is provided with a tapped opening for receiving a mounting screw 21. As indicated in FIG. 1, similar mounting screws 20, 22, and 23 are utilized, at the support members associated with the bosses 12, 14 and 15. The resulting support structure is employed to mount a base plate 24 on the base 11 of the recording device.

Substantially the entire paper feed mechanism for the graphic recorder 10 is supported from the base plate 24. Thus, as illustrated in FIGS. 1 and 3, a pair of mounting brackets 25 and 26 are affixed to the base plate 24 at opposite sides thereof. At the left-hand side of the recording device 10, as seen in FIG. 1, a shaft 27 is supported in suitable bearings in the bracket mmebers 25 and 26, projecting outwardly beyond each of the two bracket members. A pair of sprocket wheels 31 and 32 are mounted on the outboard ends of the shaft 27 and a guide roller 33 is mounted on the central portion of the shaft, the elements 31, 32 and 33 all being affixed to the shaft for rotation therewith.

The ends of the bracket members 25 and 26 opposite the shaft 27 are utilized to support a second shaft 34 which is also journalled in suitable bearings in the bracket members and which supports a pair of sprockets 35 and 36. The sprocket wheels 35 and 36 are aligned with the sprockets 31 and 32, respectively.

A drive belt 37 is mounted upon and is driven by the sprocket 31, being extended around the mating front sprocket 35, as best shown in FIG. 2. The belt 37 is generally similar to belt devices used for timing purposes in a variety of applications and usually referred to, in the art, as timing belts. That is, the inner or rear surface of the belt is provided with a plurality of projections or teeth disposed at regular spaced intervals and engageable in corresponding recesses in the two sprocket members 31 and 35. In addition to the driving lugs or teeth 38, however, the belt 37 includes a plurality of drive pins 39, preferably spaced on a one-to-one ratio relative to the drive lugs 38 and projecting outwardly of the outer face of the belt. Thus, the belt 37 effectively constitutes an elongated continuous sprocket member and, for this reason, is referred to hereinafter as a sprocket belt. A similar sprocket belt 41 is located at the opposite side of the recording device from the belt 37 (see FIGS. 1 and 3) and engages the drive sprocket 32 and the idler sprocket 36.

As best shown in FIG. 4, the two side brackets 25 and 26 also support a guide plate 44 that extends across the two brackets and projects outwardly thereof at the sides. Plate 44 has mounted thereon a platen 45 that provides the writing surface for the recording device 10 as described more fully hereinafter. The projecting portion 47 at one side of the plate 44 is disposed immediately beneath the sprocket belt 37 and supports the central portion of the sprocket belt, maintaining it in flat aligned relation with the platen. The thickness of the platen 45 is selected to match approximately the thickness of the belt 37, so that the upper surface of the belt is accurately aligned with the writing surface of the platen 45. The similar extension 48 of the plate 44 at the opposite side of the machine affords a support for the central portion of the second sprocket belt 41. As shown in FIG. 2, the right-hand end of the plate 44 is bent upwardly to provide an exit guide 49 for the paper web or other recording medium.

A lower paper guide or chute 51 is suspended from the base plate 24 (see FIG. 2). The paper chute 51 extends upwardly at an angle from the right-hand portion of the machine, as seen in this view, and terminates in a curved portion 52 that is effective to guide a paper web 53 into engagement with the sprocket belts such as the belt 37 when the paper web is inserted in the recording device 10. The paper supply itself may comprise a roll of paper 54 mounted upon a suitable shaft 55 that is journalled in a pair of bracket members 56 mounted on the base 11 of the machine. Alternatively, a supply of folded paper forms of the continuous feed type may be disposed in a magazine 58 mounted on the machine to replace the roll paper supply comprising the members 54–56.

At the left-hand side of the recording device 10, as seen in FIGS. 1 and 2, which is the forward end of the machine, there are a pair of vertical support members 61 and 62 that are mounted upon the base plate 24. The support members 61 and 62 afford a mounting support for the leading edge of the cover 63 of the machine. Furthermore, the members 61 and 62 provide a mounting base for a U-shaped paper guide 64 that comprises an important part of the paper feed and alignment mechanism of the invention.

Thus, the paper guide 64 includes two elongated side arms 65 and 66 that are connected by a bridging member 67. The one arm 65 of the paper guide 64 is pivotally mounted on the vertical support member 61 as shown in FIG. 2. Similarly, the other side arm 66 of the U-shaped paper guide is pivotally mounted upon the vertical support member 62 (see FIG. 1).

Figure 5:
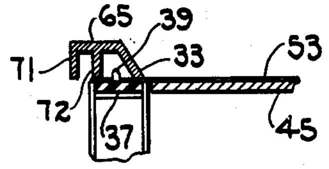
FIG. 5 is a detail sectional view illustrating a part of the paper feed mechanism.

FIG. 5 shows the detail of the cross-sectional configuration for the arm 65 of the paper guide 64. As illustrated therein, the arm 65 includes an outer skirt portion 71 and a pair of depending leg elements 72 and 73. The leg portions 72 and 73 are aligned with and are positioned to bear downwardly on the outer edges of the sprocket belt 37. Thus, the elements 72 and 73 of the paper guide leg 65 are positioned to engage and press the paper web or other recording medium 53 into initimate contact with the sprocket belt 37 throughout the length of the belt. The same construction is used for the other leg 66 of the U-shaped paper guide 64 (FIG. 1). It is thus seen that the two side or leg portions 65 and 66 of the paper guide hold the recording medium flat throughout its length across the platen 45 and also hold the paper in intimate contact with each of the sprocket belts throughout their respective lengths.

The transverse portion 67 of the paper guide 64 projects outwardly into close proximity to the end portion 49 of the plate 44 as shown in FIG. 2. Thus, the members 49 and 67 afford a guide for directing the outward movement of the recording medium from the recording device 10; they also afford a tearing edge for tearing off a length of the paper or other recording medium upon completion of a paper feed movement as described more fully hereinafter.

Figure 6:
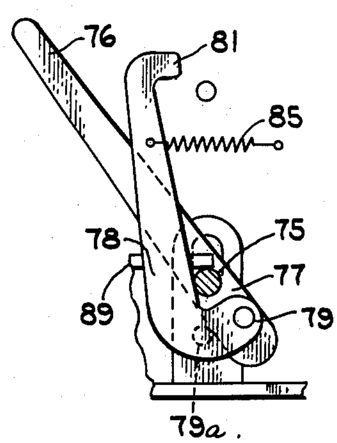
FIG. 6 is a detail elevation view of the hold-down latch for the main paper guide in the apparatus of FIGS. 1–3.
Figure 7:
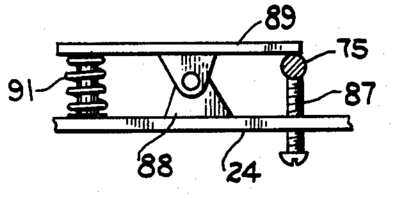
FIG. 7 illustrates a detail of the mounting for the paper guide latch.

Rather than depend upon the weight of the paper guide 64 to hold the paper in intimate contact with the platen and the sprocket belts, a latching or hold-down mechanism is provided for the U-shaped paper guide 64. This mechanism is best illustrated in FIGS. 2, 6 and 7. As shown therein, the hold-down mechanism comprises a shaft 75 that extends across the recording device 10 above the base plate 24 and intermediate the two belts 37 and 41. A toggle arm 76 is affixed to the shaft 75 to afford a means for rotating the shaft. The lower end 77 of the toggle arm extends beyond the shaft 75 and a latching lever 78 is pivotally mounted on the end 77 of the toggle arm as indicated by reference numeral 79. A lever 78 is substantially L-shaped in configuration, the inner corner of the L engaging the shaft 75 as shown in FIG. 6. The upper end of the lever 78 comprises a dog 81 that is positioned to engage a pin 82 affixed to and projecting outwardly of the paper guide leg 65 (see FIGS. 1 and 2). At the opposite side of the machine a second lever 83 is provided, the lever 83 being essentially similar in configuration to the lever 78 and being positioned to engage a pin 84 that projects outwardly of the other leg 66 of the paper guide 64. A spring 85 biases the lever 78 in a direction to bring the dog 81 into engagement with the pin 82, and a similar spring bias is provided for the corresponding lever 83 at the opposite side of the machine.

The shaft 75 is not fixed, with respect to vertical position; rather, the mounting arrangement for the shaft permits a slight vertical movement of the shaft. Thus, as illustrated in FIG. 7, the opposite ends of the shaft 75 are positioned to engage a pair of adjustable stop members 87 mounted on the base plate 24, only one of the stop members being shown. At the center of the machine a bracket 88 is mounted upon the base plate 24 and a hold-down lever 89 is pivotally mounted on this bracket. One end of the lever 89 is positioned to engage the shaft 75 and to bias the shaft downwardly into contact with the two adjustable stops 87. A spring 91 engages the opposite end of the lever 89 to afford the necessary biasing force.

The recording device 10 further includes a tensioning means that operates conjointly with the latching mechanism for the paper guide 64. This tensioning means comprises a spring member 93 that is mounted on the underside of the base plate 24 and extends downwardly toward the paper chute 51. The spring member 93 tends to remain above the chute 51 out of contact with the paper. A second spring member 94 is mounted above the spring 93, being affixed to a support member 95 which, in turn, is mounted on the base plate 24. The spring member 94 is positioned to be engaged by a lever 96, the lever 96 comprising a cam follower that engages a cam 97 affixed to the toggle shaft 75. This linkage affords a convenient means for depressing the spring member 93 when the paper guide 64 is latched in operating position as described more fully hereinafter.

To provide a means for advancing the recording medium 53, a paper feed motor 98 is included in the recording device 10, being suspended from a series of support posts 99 that are mounted upon the base plate 24. The shaft 101 of the motor 98 extends upwardly and carries a worm-type pinion gear 102. As illustrated in FIGS. 1 and 2, the pinion 102 is in meshing engagement with a drive gear 103 that is affixed to the shaft 27 for the sprockets 31 and 32. Thus, energization of the motor 98 is effective to rotate the shaft 27 and advance the paper 53 when desired.

Figure 8:
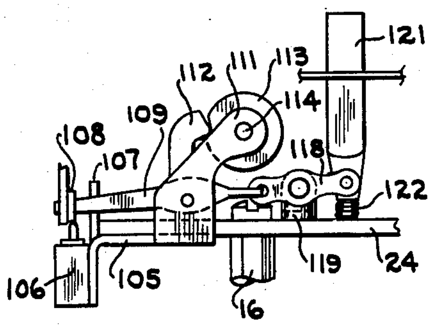
FIG. 8 is a detail elevation view of a paper feed control mechanism incorporated in the recording device.
Figure 9:
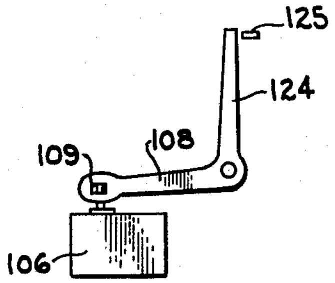
FIG. 9 is a further detail view showing a part of the paper feed control device.

FIGS. 1, 8 and 9 afford the best illustration of the control and actuating mechanism for the paper feed motor 98. As shown in FIGS. 1 and 8, a mounting bracket 105 is affixed to the base plate 24 and a motor control switch 106 is mounted upon this bracket. The bracket 105 also includes an upwardly extending portion 107 upon which a switch actuator arm 108 is pivotally mounted. The switch actuating arm 108 is slotted, at one end thereof, to receive an operating lever 109 that is pivotally mounted upon a vertical extension 111 of the bracket 105.

The operating lever 109 includes a cam follower extension 112 positioned to engage a single notch cam 113 that is mounted on and affixed to a short shaft 114. The shaft 114 carries a gear 115 that is disposed in meshing engagement with a spur gear 116 mounted on the shaft 27. Thus, the gears 116 and 115 cooperate to rotate the cam 113 whenever the paper drive shaft 27 is rotated to control the period during which the motor 98 is energized as described more fully hereinafter.

A manual control is provided for the operating lever 109. This manual control comprises a link 118 that is pivotally mounted upon a bracket 119 supported upon the base plate 24 as best shown in FIG. 8. The end of the link 118 opposite that connected to the operating lever 109 is connected to a push button 121. The push button 121 is normally held in elevated or inactive position by suitable means such as a spring 122 but can be depressed to actuate the link 118 and thereby operate the lever 109.

The switch actuating lever 108 is provided with an extension 124 (see FIG. 9) that is positioned to be engaged by a lever 125. The lever 125, as shown in FIG. 1, is mounted upon the shaft 126 of one of the co-ordinate positioning motors 127 of the recording device. The pen motor 127 is paired with a second pen motor 128 in a drive linkage 129 for driving the pen arm 131 of the recording device 10. It will be recognized that the motors 127 and 128, the linkage 129, and the pen arm 131 are incorporated in a construction essentially similar to that described in detail in the aforementioned patents of Robert Adler; accordingly, no further description of this portion of the recording device 10 is deemed necessary herein. Of course, a suitable recording stylus or pen is mounted on the end of the pen arm 131 in position to record data on the recording medium 53 disposed upon the surface of the platen 45.

In considering the operational features of the present invention, the best starting point is the technique followed in assembling the paper drive mechanism of the machine. In the first place, all of the principal components of the paper drive including the paper guide 64 are first assembled on the base plate 24. That is, the sprocket belts and their drive mechanism are completely assembled on the base plate 24 together with the motor 98, the complete latch-down mechanism for the paper guide 64, and the paper tensioning apparatus comprising the spring 93. This complete assembly is then mounted on the base 11 of the machine.

In the mounting of the paper feed mechanism on the machine, the vertical support members 16–19, are first threaded into the bosses 12–15 of the base 11, the lock nuts for the support extensions having first been mounted thereon. The four support extensions are leveled individually to mount the base plate 24 in accurate alignment with the remainder of the machine, after which the mounting screws 20–23 are employed to secure the base plate 24 on the extension supports. The lock nuts are, of course, employed to prevent subsequent change in the mounting of the support extensions such as the member 17 (FIG. 2). Thus, the paper feed mechanism is assembled as a complete unit independent of the remainder of the operating mechanism of the recording device 10 and is mounted in the recording device 10 as a unit without requiring accurate alignment or other coordination with respect to the base 11 other than the adjustment afforded by the adjustable vertical supports 16–19.

To thread a paper web or other recording medium through the recording device 10, the toggle arm 76 is moved to the position shown in FIG. 6 and indicated by the dash outline 76A in FIG. 2. With the toggle arm 76 moved to this position, the corresponding pivotal movement of the two latch-down levers 78 and 83 moves these levers clear of the latching pins 82 and 84. This relationship is most clearly shown in FIG. 6, where it is seen that the dog 81 is clear of the pin 82. This makes it possible to pivot the paper guide 64 away from the sprocket belts and the platen, the paper guide moving in a counterclockwise direction from the position illustrated in FIG. 2. At the same time, the tensioning spring member 93 is released from engagement with the paper in the chute 51.

Under these conditions, it is possible to thread the paper web or other recording medium 53 upwardly along the chute 51, the end of the paper being guided up around the sprockets 31 and 32 by the curved portion 52 of the paper chute 51. The paper can then be grasped near the end of the chute portion 52 and pulled forward over the platen 45 and out beyond the end 49 of the plate 44. The paper web is, of course, provided with feed apertures positioned to be engaged by the sprocket teeth 39 on the sprocket belts (see FIGS. 1 and 2), and the paper is pressed downwardly over the sprocket pins on the belts.

Following the threading of the paper through the machine as described above, the paper guide 64 is lowered, engaging the two leg portions 65 and 66 of the paper guide 64 with the edges of the paper on the belts 37 and 41. This relationship is described above in connection with FIG. 5. The toggle lever 76 is then pivoted from the released position shown in FIG. 6, in a clockwise direction, to the latched position illustrated in FIG. 2. As the lever 76 moves in a clockwise direction, the spring 85 pulls the lever 78 clockwise until it is located over the pin 82. Continued movement of the toggle 76 in a clockwise direction pulls the mounting pin 79 for the lever 78 downwardly to the position 79A, engaging the dog 81 firmly with the pin 82. The pivotal movement of the toggle lever 76 further tends to raise the shaft 75 slightly, lifting the ends of the shaft just above the stop members 87. It is thus seen that, with the paper guide latch in latched condition, the position of the shaft 75 is determined by the biasing force applied to the center of the shaft through the lever 89 (see FIG. 7). In this manner, the downward biasing and latching force applied to the U-shaped guide member 64 is balanced, with the result that substantially equal holding forces are applied to the two edges of the paper, holding the paper in engagement equally with the sprocket belts 39 and 41.

Actuation of the latch-down mechanism for the paper guide 64 also pivots the cam follower lever 96, depressing the spring 94 and, in turn, urging the tensioning spring member 93 downwardly into engagement with the paper 53 in the paper chute 51. This provides a predetermined drag on the paper and assures even feeding of the paper in the course of a paper feed operation as described hereinafter.

One means for feeding a predetermined length of paper across the platen 45 is provided by the pushbutton 121.

If the pushbutton 121 is depressed, the link 118 is pivoted clockwise; as a result, the operating lever 109 is pivoted in a counterclockwise direction. The counterclockwise movement of the operating lever 109 depresses the switch actuating lever 108, closing the switch 106. The switch 106 is connected in the operating circuit for the paper feed motor 98 and, accordingly, the motor is energized.

With the motor 98 energized, the shaft 27 is driven through the drive connection comprising the motor shaft 101, the pinion 102, and the gear 105 (see FIGS. 1 and 2). The shaft 27 is rotated in a clockwise direction, driving both of the belts 37 and 41 and feeding the paper web 53 to the right, outwardly of the machine, as seen in these figures. Furthermore, the driving connection provided by the gears 116 and 115 causes the cam 113 to rotate, clearing the notched portion of the cam with respect to the cam follower 112 of the operating lever 109. Thus, although the pushbutton 121 may have been depressed only momentarily, the cam 113 holds the operating lever 109 in its actuated condition until a complete revolution of the cam is effected. That is, the motor 98 is held energized until the cam 113 completes a full revolution and the cam follower 112 drops back into the cam notch, permitting the operating lever 109 to return to its original unactuated position. In different applications, it may be desirable to provide for variations in the length of paper fed. This can be accomplished easily and conveniently by selection of the relative sizes of the gears 115 and 116.

Where the recording device 10 constitutes a receiver in a graphic communication system, it is desirable to provide for automatic actuation of the paper feed mechanism in response to movement of a transmitter pen to a predetermined position, at the transmitter, as generally described in Patent No. 2,621,249 to T. I. Ress. That is, when the transmitter pen is driven to one pre-selected edge of its writing surface, and the receiver pen of the device 10 is driven to the same position, the paper feed mechanism should be actuated. This is effected by the lever 125 actuated by the pen motor 127 (FIGS. 1 and 9). That is, when the motor 127 is actuated to one extreme rotational position the lever 125 engages the extension 124 of the switch actuating lever 108 and pivots the switch actuating lever in a counterclockwise direction as illustrated in FIG. 9. This closes the switch 106 and energizes the motor, after which the paper feed operation proceeds automatically in the same manner as described hereinabove where actuation was effected with the pushbutton 121.

After a paper feed operation is completed, the outwardly extending portion 53A of the paper (FIG. 2) is severed against the tearing edge of the paper guide 64. The recording device 10 is then ready for the next recording operation. Of course, the paper web can be removed at any time by unlatching the paper guide 64 and lifting it out of engagement with the paper, thereby clearing the upper length of the paper so that it can be disengaged from the sprocket belts and removed from the recording device.

Figure 10:
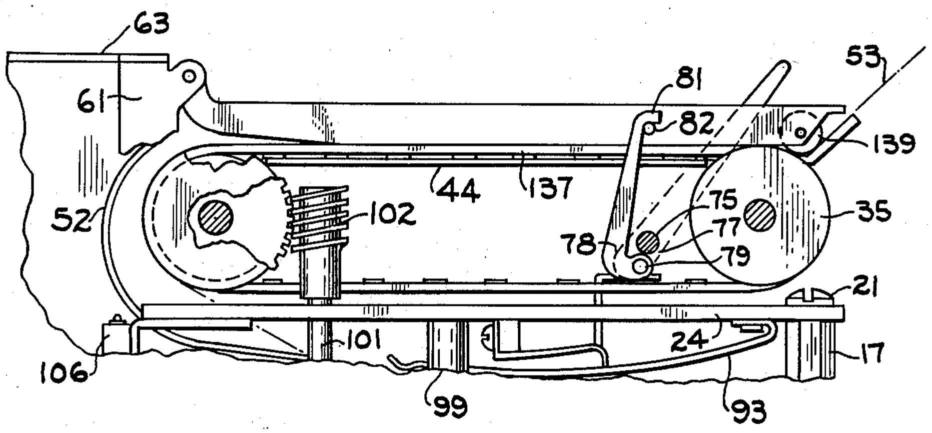
FIG. 10 is a partial elevation view, similar to FIG. 2, illustrating a modification of the present invention.

FIG. 10 illustrates a variation of the basic paper feed mechanism utilized in connection with a friction drive instead of the positive or sprocket drive described hereinabove. Thus, the mechanism as illustrated in FIG. 10 is essentially the same as that of FIG. 2 in most respects. In this instance, however, the sprocket belt 37 is replaced by a friction belt 137 having a frictional surface devoid of pins. The belt 137 is still preferably a belt of the kind provided with positive drive lugs on the rear surface thereof, such as the lugs 138, and thus is substantially similar to a conventional timing belt. In this instance, an additional roller 139 is mounted on the forward end of the paper guide 64 in position to engage the edge of the paper immediately over the drive sprocket 35. A similar roller would, of course, be mounted at the opposite side of the machine in position to hold the paper in intimate contact with the other sprocket 36 (see FIG. 3). In this embodiment of the invention, the paper guide 64 and the rollers 139 cooperate to hold the entire edge of the paper in intimate frictional contact with the feed belts, such as the belt 137. Consequently, an effective and positive drive arrangement is provided and, despite the fact that it is a frictional drive, accurate paper feed movements are and can be effected by the drive.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. A paper feed mechanism for a graphic communication recording device of the kind in which data are recorded by a stylus moving across a portion of a paper web or other recording medium supported on a platen, comprising: a pair of drive belts; sprocket means for mounting the drive belts on opposite sides of the platen in spaced parallel relation to each other; guide means for holding the edges of the web in contact with the drive belts, said guide means including a pair of guide leg members each mounted adjacent a respective one of the drive belts and each movable between a released position displaced from the associated drive belt and an engaged position in which the guide leg member bears upon the edge of the web and urges it into contact with the belt; latching means comprising two individual latch devices for latching the respective guide leg members in their respective engaged positions, holding the web flat against the platen, said latching means further including resilient biasing means common to both latches for equalizing the holding forces applied to the opposite edges of the web; and drive means for driving the belts simultaneously to advance the web, while engaged between the guide means and the drive belts, across the platen.

2. A paper feed mechanism for a graphic communication recording device of the kind in which data are recorded by a stylus moving across a portion of a paper web or other recording medium supported on a platen, comprising: a pair of drive belts, sprocket means for mounting the drive belts on opposite sides of the platen in spaced parallel relation to each other; guide means for holding the edges of the web in contact with the drive belts, said guide means including a U-shaped guide having a pair of leg members each aligned with a respective one of the drive belts and a connecting member extending across and connected to one end of each leg member, the other ends of the leg members being pivotally mounted to allow pivotal movement of the U-shaped guide relative to the platen between a released position in which the leg members are displaced from the associated drive belts and an engaged position in which the leg members bear upon the edges of the web and urge it into contact with the belts; releasable latching means comprising individual latch devices for latching the respective leg members of the guide in engaged position, holding the web flat against the platen, said latching means further including resilient biasing means common to both latches for equalizing the holding forces applied to the opposite edges of the web; a releasable tensioning device for applying a tensioning force to said web in a direction parallel to said drive belts; means for releasing said tensioning device in response to release of said latching means; and drive means for driving the belts simultaneously to advance the web, while engaged between the guide means and the drive belts, across the platen.

3. A paper feed mechanism for a graphic communication recording device of the kind in which data are recorded by a stylus moving across a portion of a paper web or other recording medium supported on a platen, comprising: a pair of drive belts; sprocket means for mounting the drive belts on opposite sides of the platen in spaced parallel relation to each other, said sprocket means including two pairs of sprockets with the sprockets in each pair spaced a substantial distance from each other on a given side of the platen; guide means for holding the edges of the web in contact with the drive belts, said guide means including a pair of elongated guide leg members each mounted adjacent a respective one of the drive belts and each movable between a released position displaced from the associated drive belt and an engaged position in which the guide leg member bears upon the edge of the web and urges it into contact with the belt; support means, comprising a support plate disposed on the side of each belt opposite the associated guide leg member in position to engage and prevent sagging of each belt intermediate the pair of sprockets engaged by that belt and to hold the surface of the belt parallel with the surface of the platen; latching means comprising two individual latch devices for latching the respective guide leg members in their respective engaged positions, holding the web flat against the platen and holding the associated belts against the support means, said latching means further including resilient biasing means common to both latches for equalizing the holding forces applied to the opposite edges of the web; and drive means for driving the belts simultaneously to advance the web, while engaged between the guide means and the drive belts, across the platen.

4. A paper feed mechanism according to claim 3 in which at least one of the drive belts is provided with a plurality of web feeding pins projecting outwardly thereof, at equally spaced intervals along the belt, in position to engage in correspondingly spaced feed apertures in the web, said belt thereby affording an elongated paper feed sprocket extending the length of the platen, and in which said drive belts are located beyond the outside edges of said platen.

5. A paper feed mechanism according to claim 3, in which the guide leg members are of cantilever construction each pivotally mounted at one end thereof, and including two pressure rollers mounted on the free ends of the guide leg members in position to urge the web into frictional contact with the respective drive belts when the guide leg members are in engaged position.

6. A paper feed mechanism for a graphic communication recording device of the kind in which data are recorded by a stylus moving across a portion of a paper web or other recording medium supported on a platen, and including a main base member for mounting the stylus, the stylus drive, and signal apparatus for the recording device, said paper feed mechanism comprising: a base plate; adjustable mounting means for mounting said base plate on said main base member; a pair of drive belts; sprocket means for mounting the drive belts on opposite sides of the platen in spaced parallel relation to each other; guide means for holding the edges of the web in contact with the drive belts, said guide means including a pair of elongated guide leg members each mounted adjacent a respective one of the drive belts and each movable between a released position displaced from the associated drive belt and an engaged position in which the guide leg member bears upon the edge of the web and urges it into contact with the belt; latching means for latching the guide leg members in their respective engaged positions, holding the web flat against the platen; resilient biasing means, connected to said latching means, for balancing the holding forces applied to the opposite edges of said web; and drive means for driving the belts simultaneously to advance the web, while engaged between the guide means and the drive belts, across the platen, the platen, sprocket means, drive belts, guide means, latching means and drive means constituting a self contained unit mounted on said base and mountable and demountable with respect to said main base member as a unit.

7. A paper feed mechanism for a graphic communication recording device of the kind in which data are recorded by a lightweight inking stylus moving across a portion of a paper web or other recording medium supported on a platen, comprising: a pair of drive belts; sprocket means for mounting the drive belts on opposite sides of the platen in spaced parallel relation to each other; guide means for holding the edges of the web in contact with the drive belts, said guide means including a pair of guide leg members each mounted adjacent a respective one of the drive belts and each movable between a released position displaced from the associated drive belt and an engaged position in which the guide leg member bears upon the edge of the web and urges it into contact with the belt; latching means for latching the guide leg members in their respective engaged positions, holding the web flat against the platen, said latching means comprising a pair of toggle latch members mounted on opposite ends of a support shaft extending transversely of said platen and engageable with complementary latch members mounted on said guide leg members; a resilient central mounting for said support shaft, effective to equalize the holding forces applied to said latch members and thereby equalize the holding forces applied to the opposite edges of the web; and drive means for driving the belts simultaneously to advance the web, while engaged between the guide means and the drive belts, across the platen.

References Cited in the file of this patent

UNITED STATES PATENTS

| | | |
|---|---|---|
| 1,247,891 | Stern | Nov. 27, 1917 |
| 2,730,358 | Riordan | Jan. 10, 1956 |